US007776115B2

(12) United States Patent
Oh et al.

(10) Patent No.: US 7,776,115 B2

(45) Date of Patent: Aug. 17, 2010

(54) MULTI CYCLONE DUST-SEPARATING APPARATUS OF VACUUM CLEANER

(75) Inventors: Jang-Keun Oh, Gwangju (KR); Jung-Gyun Han, Gwangju (KR); Min-Ha Kim, Gwangju (KR)

(73) Assignee: Samsung Gwangju Electronics Co., Ltd, Gwangju (KR)

(*) Notice: Subject to any disclaimer, the term of this patent is extended or adjusted under 35 U.S.C. 154(b) by 446 days.

(21) Appl. No.: 11/975,098

(22) Filed: Oct. 17, 2007

(65) Prior Publication Data

US 2008/0264017 A1 Oct. 30, 2008

(30) Foreign Application Priority Data

Apr. 24, 2007 (KR) ...................... 10-2007-0039764

(51) Int. Cl.
*B01D 45/12* (2006.01)

(52) U.S. Cl. ............................ 55/343; 56/349; 56/429; 56/457; 56/459.1; 56/DIG. 3

(58) Field of Classification Search ................... 55/343, 55/346, 349, 429, 457, 459.1, DIG. 3
See application file for complete search history.

(56) References Cited

U.S. PATENT DOCUMENTS 2,542,634 A 2/1951 Davis et al.
6,647,587 B1 11/2003 Ohara et al. .................. 15/350
7,491,255 B2 * 2/2009 Jung ........................... 55/343
7,662,202 B2 * 2/2010 Oh et al. .................... 55/459.1

FOREIGN PATENT DOCUMENTS

GB 2374305 10/2002
KR 1020060031443 4/2006

* cited by examiner

*Primary Examiner*—Robert A Hopkins
(74) *Attorney, Agent, or Firm*—Ohlandt, Greeley, Ruggiero & Perle, LLP

(57) ABSTRACT

A multi cyclone dust-separating apparatus is disclosed that includes a cyclone unit having a first cyclone, a plurality of second cyclones, and a dust collecting unit. The first cyclone is disposed so that a longitudinal axis thereof is substantially vertically arranged. The first cyclone separates relatively large dust or dirt from air drawn in through a first air inflow part. Each of the second cyclones is disposed so that longitudinal axes thereof are substantially vertically arranged. Each of the second cyclones has a second air inflow part to communicate with the first cyclone and an air discharging part to discharge the air. The second cyclones separate relatively minute dust or dirt from the air drawn in through the second air inflow part. The dust collecting unit is disposed below the cyclone unit to collect and store the dust or dirt separated from the air by the cyclone unit.

14 Claims, 15 Drawing Sheets

MULTI CYCLONE DUST-SEPARATING APPARATUS OF VACUUM CLEANER

CROSS-REFERENCE TO RELATED APPLICATIONS

This application claims the benefit under 35 U.S.C. §119 (a) of Korean Patent Application No. 10-2007-0039764, filed on Apr. 24, 2007, in the Korean Intellectual Property Office, the entire content of which is hereby incorporated by reference.

BACKGROUND OF THE INVENTION

1. Field of the Invention

The present disclosure relates to a vacuum cleaner. More particularly, the present disclosure relates to a multi cyclone dust-separating apparatus of a vacuum cleaner, which draws in an external air and then separates dust or dirt by several stages therefrom.

2. Description of the Related Art

In general, a cyclone dust-separating apparatus provided in a vacuum cleaner is an apparatus, which whirls air laden with dirt or dust and separates the dirt or dust therefrom. Such a cyclone dust-separating apparatus has been recently widely used because it can be semi-permanently used without any inconvenience of frequently replacing dust bags.

The cyclone dust-separating apparatus usually has a single cyclone structure, which includes a cyclone to make drawn-in air into a whirling current and thus to separate dust or dirt from the drawn-in air, an air inflow part to guide the drawn-in air to flow into the cyclone in a tangential direction thereof, and a dust collecting bin to collect and store the separated dust or dirt therein. The cyclone dust-separating apparatus having the single cyclone structure as described above separates all of large dust or dirt, medium dust or dirt, and minute dust or dirt from the drawn-in air at once. Accordingly, relatively large and heavy dust or dirt can be easily filtered, but relatively minute dust or dirt, such as particle, is apt to be discharged as mixed with the air. As a result, the conventional cyclone dust-separating apparatus presents a problem that a dust-separating efficiency is deteriorated.

To address the problem as described above, in recent, a multi cyclone dust-separating apparatus in which a plurality of cyclones is installed to separate dust or dirt by several stages from drawn-in air is actively developing. Such a multi cyclone dust-separating apparatus is advantageous in that since it separates the dust or dirt in the several or multiple stages, it can remove even minute dust or dirt, such as particle, thereby increasing a dust-separating efficiency. However, in the multi cyclone dust-separating apparatus, there is a problem that since a cyclone body of each of the cyclones is formed in a linear cylinder shape, the diameter of which is uniform in a longitudinal direction thereof, or a shape having a truncated cone portion at a lower part thereof, the drawn-in air increases its flowing speed when it is discharged through an air discharging part of the cyclone body after flowing into the cyclone body. Such an increase in the flowing speed of the air at the air discharging part not only increases a pressure loss, but also increases an operating noise. The increase in the pressure loss may increase an output of a suction motor of the vacuum cleaner, which is required to obtain the same dust-separating efficiency, thereby causing the vacuum cleaner to use more power.

SUMMARY OF THE INVENTION

An aspect of the present disclosure is to address at least the above problems and/or disadvantages and to provide at least the advantages described below. Accordingly, an aspect of the present disclosure is to provide a multi cyclone dust-separating apparatus having a reduced operating noise and a reduced pressure loss.

In accordance with an aspect of the present disclosure, a multi cyclone dust-separating apparatus includes a cyclone unit having a first cyclone, which is disposed in such a manner that a longitudinal axis thereof is substantially vertically arranged and which separates relatively large dust or dirt from air drawn in through a first air inflow part, and a plurality of second cyclones, each of which is disposed in such a manner that longitudinal axes thereof are substantially vertically arranged, each of which has a second air inflow part to communicate with the first cyclone and an air discharging part to discharge the air, and each of which separates relatively minute dust or dirt from the air drawn in through the second air inflow part, and a dust collecting unit disposed below the cyclone unit to collect and store the dust or dirt separated from the air by the cyclone unit. Each of cyclone bodies of the plurality of second cyclones is formed in a convex cylinder shape that a diameter thereof in the vicinity of an entrance of the air discharging part comes maximum.

Here, each of the cyclone bodies of the plurality of second cyclones may be formed, so that at least two convex cylinder portions, the diameters of which are gradually increased, are joined with each other. At this time, the two convex cylinder portions may be formed to have the same lengths or different lengths in a direction of longitudinal axis thereof.

Alternatively, each of the cyclone bodies of the plurality of second cyclones may be formed, so that at least one linear cylinder portion, the diameter of which is uniform, and at least one convex cylinder portion, the diameter of which are gradually varied, are joined with each other. At this time, the two cylinder portions may be formed to have the same lengths or different lengths in a direction of longitudinal axis thereof.

In addition, each of the first and the second air inflow part may be formed in one of a tangential inlet shape through which the air are flowed into the cyclone body of the first cyclone or each of the second cyclones while coming in contact directly with an inner circumferential surface of the cyclone body, a helical inlet shape through which the air is gradually approaches in the form of a spiral toward one end surface of the cyclone body of the first cyclone or each of the second cyclones from an outside of the one end surface of the cyclone body and then flows into the cyclone body while coming in contact with the inner circumferential surface of the cyclone body, and an involute inlet shape through which the air is gradually approaches in the form of a volute toward an outer circumferential surface and the inner circumferential surface of the cyclone body of the first cyclone or each of the second cyclones from an outside of the outer circumferential surface of the cyclone body and then flows into the cyclone body while coming in contact with the inner circumferential surface of the cyclone body.

Also, the dust collecting unit may include a dust collecting bin body in the form of a convex cylinder to collect and store the dust or dirt. At this time, preferably, but not necessarily, the dust collecting bin body forms a single convex cylinder along with a cyclone body of the first cyclone.

In accordance with another aspect of the present disclosure, the cyclone body of the first cyclone may be formed in one of a shape having a truncated cone portion at a lower part thereof and a linear cylinder shape having a uniform diameter.

Also, the plurality of second cyclones may be disposed around or above the first cyclone.

BRIEF DESCRIPTION OF THE DRAWING FIGURES

The above and other objects, features, and advantages of certain exemplary embodiments of the present disclosure will be more apparent from the following description taken in conjunction with the accompanying drawings, in which.

Throughout the drawings, the same reference numerals will be understood to refer to the same elements, features, and structures.

DETAILED DESCRIPTION OF THE EXEMPLARY EMBODIMENTS

Hereinafter, a multi cyclone dust-separating apparatus of a vacuum cleaner according to certain exemplary embodiments of the present disclosure will be described in detail with reference to the accompanying drawing figures.

Figure 1:
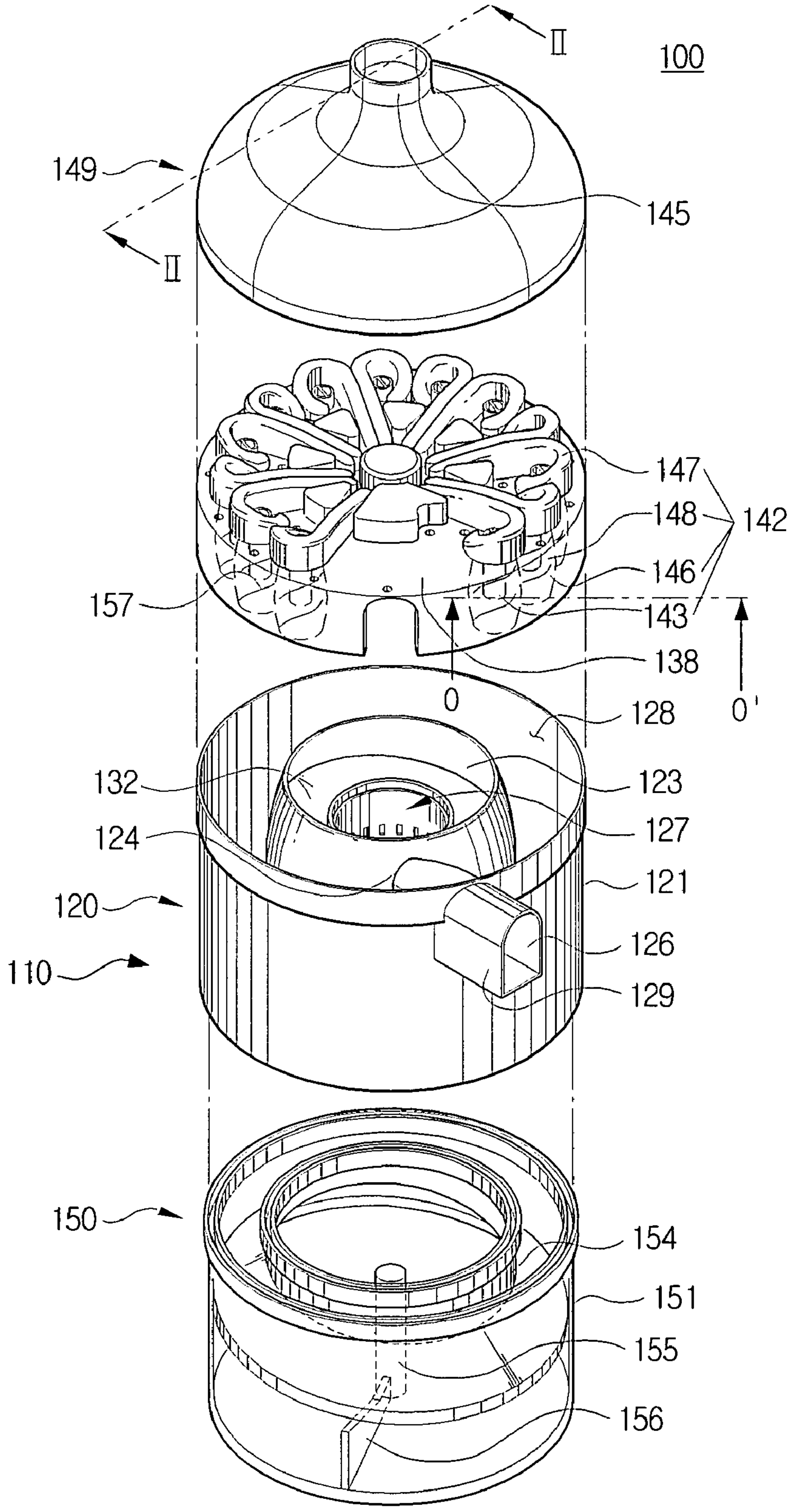
FIG. 1 is an exploded perspective view exemplifying a multi cyclone dust-separating apparatus of a vacuum cleaner according to a first exemplary embodiment of the present disclosure.
Figure 2:
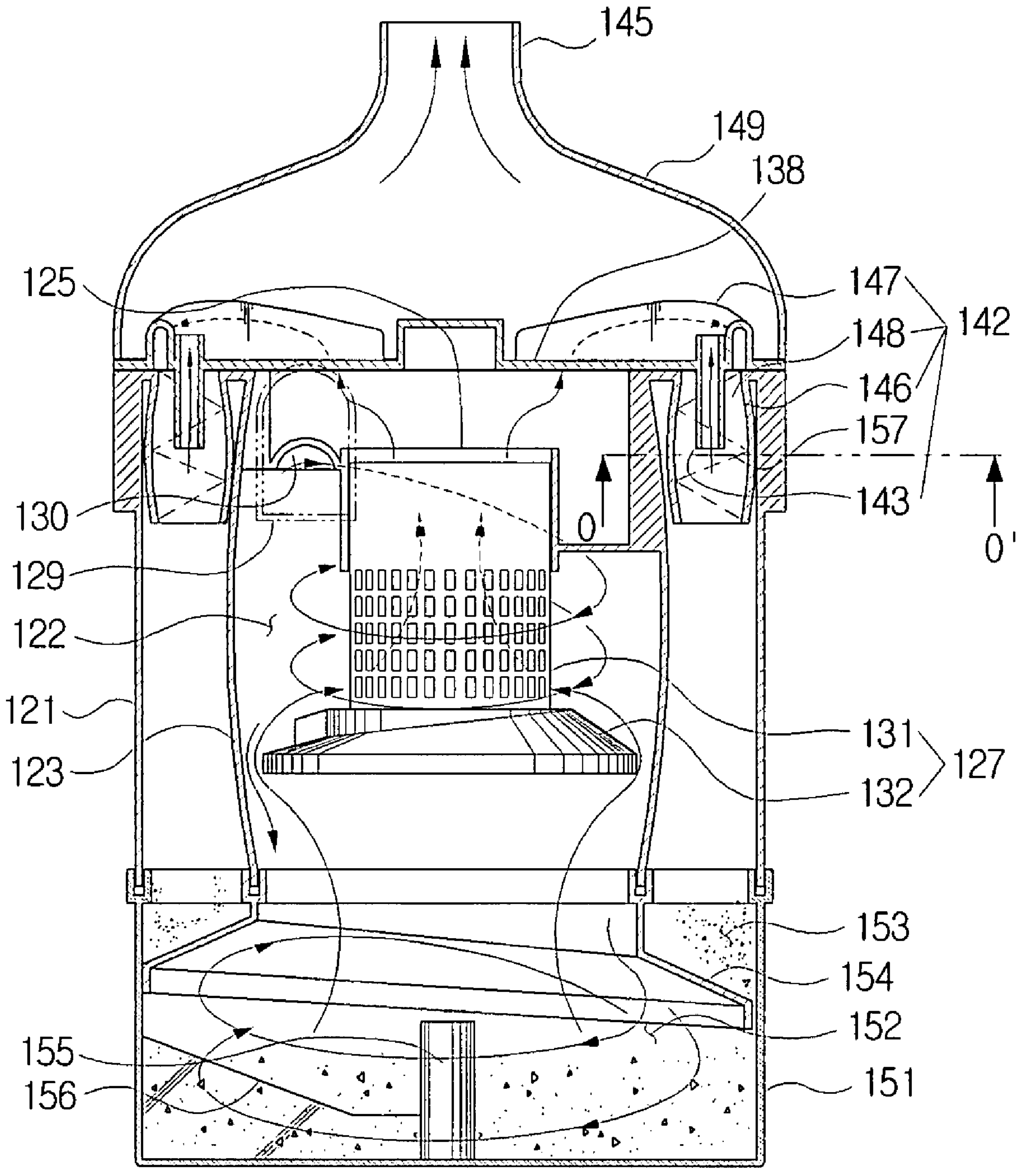
FIG. 2 is a cross-sectional view taken along line II-II of FIG. 1.

FIGS. 1 and 2 are an exploded perspective view and a cross-sectional view, respectively, exemplifying a multi cyclone dust-separating apparatus of a vacuum cleaner according to a first exemplary embodiment of the present disclosure.

Referring to FIGS. 1 and 2, the multi cyclone dust-separating apparatus 100 according to the first exemplary embodiment of the present disclosure includes a cyclone unit 110, a cover member 149 joined to an upper part of the cyclone unit 110 and a dust collecting unit 150 joined to a lower part of the cyclone unit 110.

The cyclone unit 110 is provided with a first cyclone 120, and a plurality of second cyclones 142. The first cyclone 120 is made up of a housing 121, a first cyclone body 123, an inflow pipe 129, and a grill member 127. The housing 121 forms an appearance of the first cyclone 120, and is formed in an approximately cylinder shape.

Figure 3A:
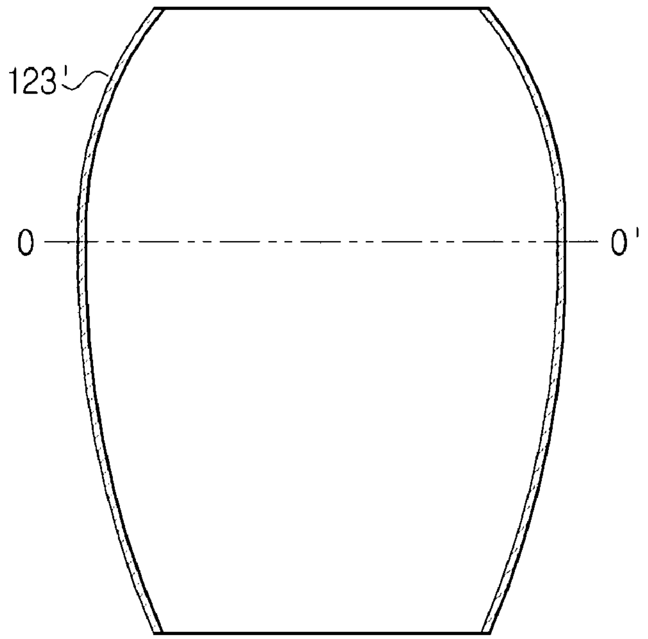
FIGS. 3A, 3B, 3C, 3D and 3E are cross-sectional views exemplifying modified examples of a first cyclone body of the multi cyclone dust-separating apparatus illustrated in FIG. 1.
Figure 3B:
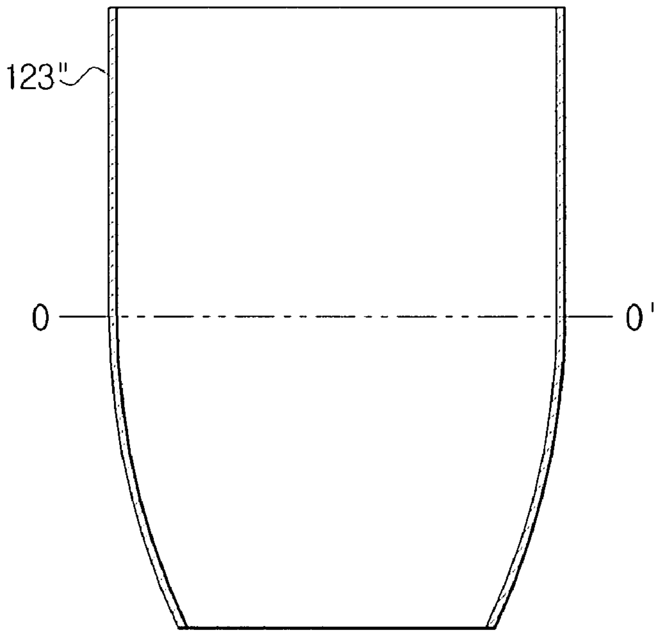
Figure 3C:
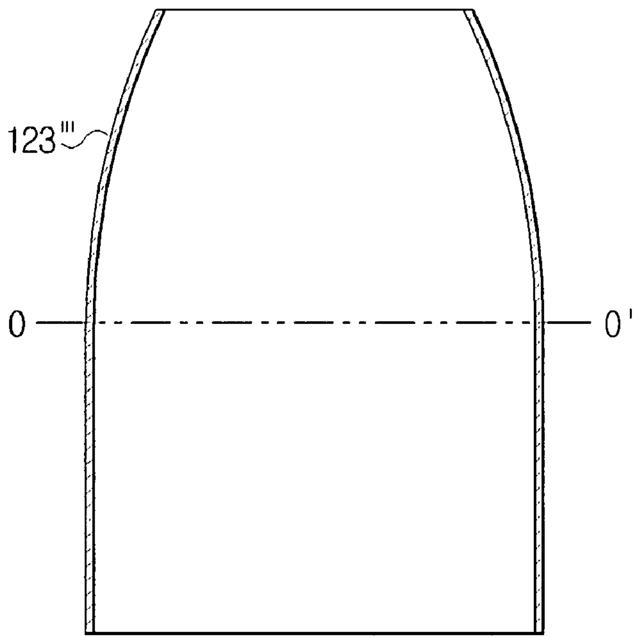
Figure 3D:
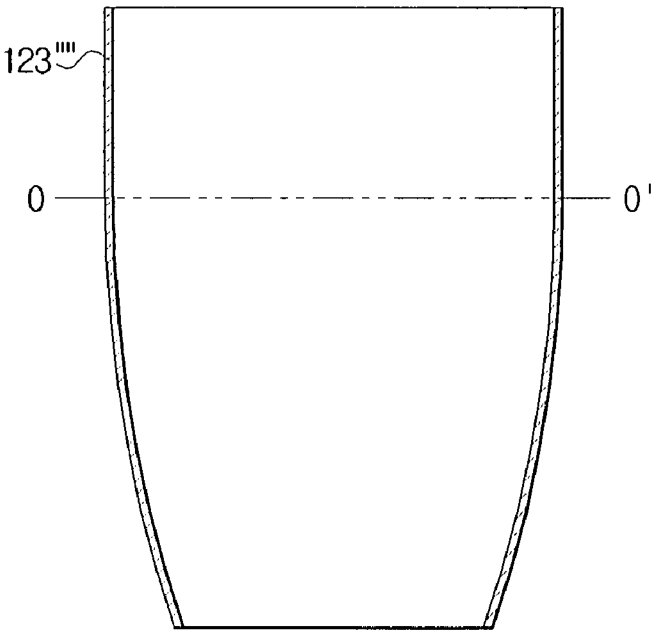
Figure 3E:
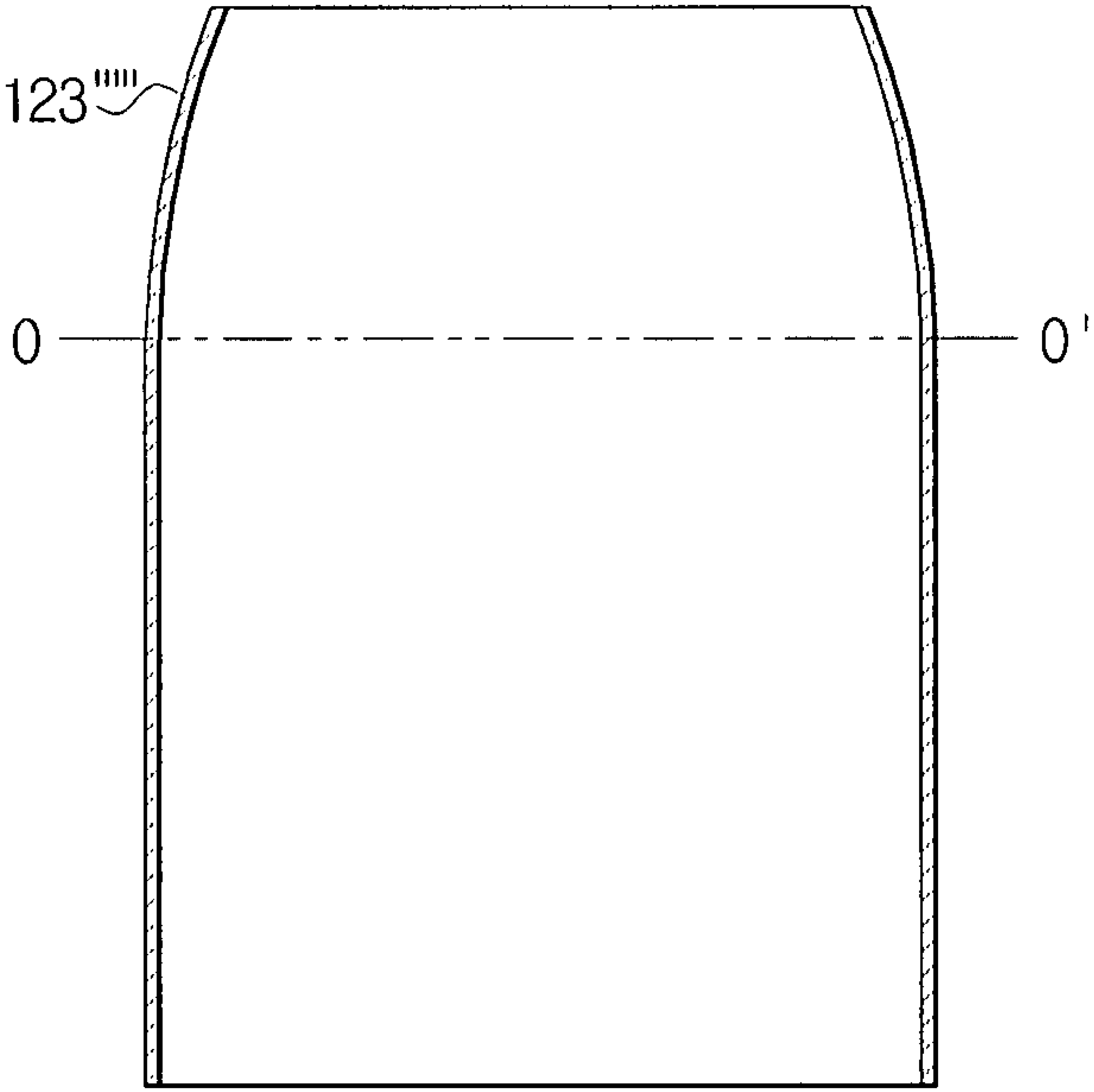

The first cyclone body 123 forms a first cyclone chamber 122, and is installed in the housing 121. The first cyclone body 123 has a convex cylinder shape. That is, the first cyclone body 123 is formed in a shape that two convex cylinder portions, the diameters of which are gradually increased from a top end and a bottom end thereof to the middle thereof, respectively, are joined to be symmetrical to each other on the middle (line 0-0') thereof. Alternatively, the first cyclone body 123 can be formed in a shape 123' that two convex cylinder portions having different lengths in a direction of longitudinal axis thereof are joined to each other (see FIG. 3A), a shape 123'' or 123''' that a linear cylinder portion, the diameter of which is uniform, and a convex cylinder portion, the diameter of which is gradually decreased or increased, having the same lengths in a direction of longitudinal axis thereof are joined to each other (see FIGS. 3B and 3C), or a shape 123'''' or 123''''' that a linear cylinder portion and convex cylinder portion having different lengths in a direction of longitudinal axis thereof are joined to each other (see FIGS. 3D and 3E) along line 0-0'. With this configuration of the first cyclone body 123, air flowing into the first cyclone chamber 122 through the inflow pipe 129 and moving into the first cyclone chamber 122 does not generate a sudden change in the flow.

Between the housing 121 and the first cyclone body 123 is formed a space part 128 in which the second cyclones 142 are disposed.

The first cyclone body 123 at a lower part thereof is opened, and at an upper part thereof is opened through a first air outlet 125. A first air inlet 124, which is connected with the inflow pipe 129, is formed to the first cyclone body 123. The first air outlet 125 is formed to have a diameter smaller than an inner diameter of the first cyclone body 123. On an inner side of the first cyclone body 123, an air guide wall 130 is installed. The air guide wall 130 is formed, so that it extends a certain distance in a shape that a height thereof in a circumferential direction is gradually lowered, for example, in a spiral direction. Accordingly, the air flowing in through the first air inlet 124 is guided by the air guide wall 130, so that it flows into the first cyclone chamber 122 while forming a whirling current.

The inflow pipe 129, which forms a first air inflow part to take in the air into the first cyclone chamber 122, guides the air laden with dust or dirt to flow into the first cyclone chamber 122. As illustrated in FIG. 1, the inflow pipe 129 is formed, so that it is connected to the first cyclone body 123 in a tangential inlet shape through which the air laden with the dust or dirt flow into the first cyclone body 123 while coming in contact directly with an inner circumferential surface of the first cyclone body 123 after passing through the housing 121. An inlet 126 provided on an outside of the inflow pipe 129 has a non-circular cross section.

Figure 4A:
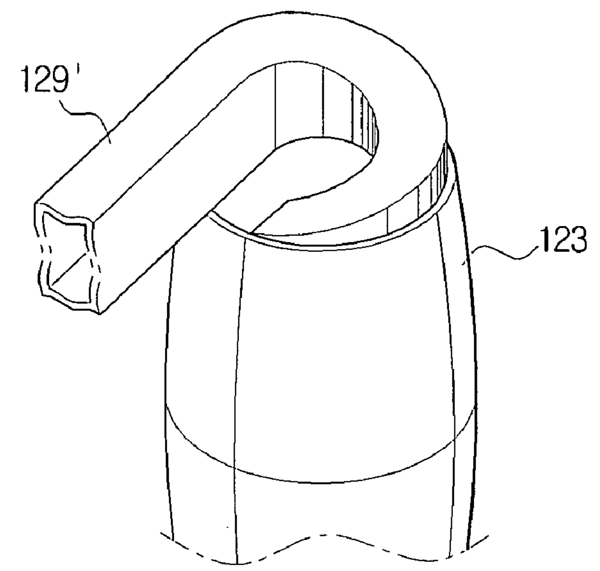
FIGS. 4A and 4B are partial perspective views exemplifying modified examples of an inflow pipe of the multi cyclone dust-separating apparatus illustrated in FIG. 1.
Figure 4B:
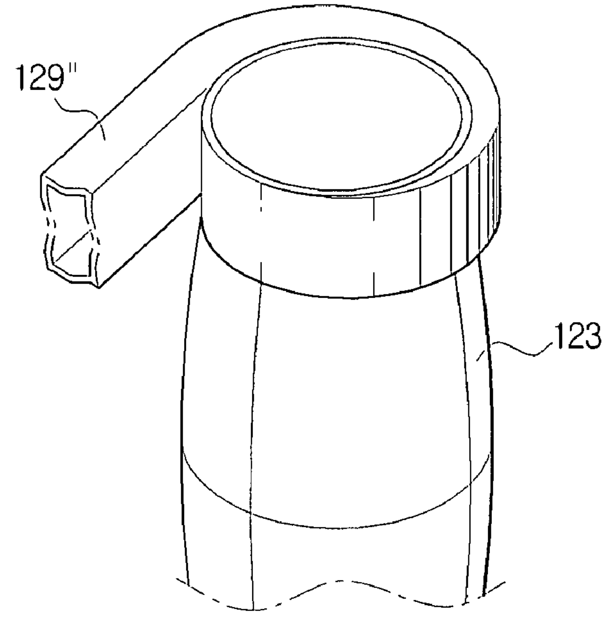

Alternatively, as illustrated in FIGS. 4A and 4B, the inflow pipe 129 can be formed in a helical inlet shape 129' through which the air gradually approaches in the form of a spiral toward a top end of the first cyclone body 123 from an upside of a top end of the first cyclone body 123 and then flows into the first cyclone body 123 while coming in contact with the top end and the inner circumferential surface of the first cyclone body 123, or an involute inlet shape 129" through which the air gradually approaches in the form of a volute toward an upper part and the inner circumferential surface of the first cyclone body 123 from an outside of the upper part of the first cyclone body 123 and then flows into the first cyclone body 123 while coming in contact with the inner circumferential surfaces of the first cyclone body 123.

The grill member 127 is joined in the upper part of the first cyclone body 123. The grill member 127 blocks relatively large dust or dirt centrifugally separated from the air in the first cyclone body 123 from flowing backward and coming out of the first cyclone body 123 toward the first air outlet 125. The grill member 127 is provided with a grill body 131 with a plurality of minute through-holes, and a skirt 132 joined to a lower end of the grill body 131. The grill body 131 at a top end thereof is opened, and has a cylinder shape. The top end of the grill body 131 is joined to the first air outlet 125. The lower end of the grill body 131 is blocked, and the skirt 132 extends on an outer circumferential surface of the lower end. The skirt 132 prevents the dust or dirt centrifugally separated from the air in the first cyclone body 123 from flowing backward.

The plurality of second cyclones 142 is disposed, so that they are inserted into the space part 128 between the housing 121 and the first cyclone body 123, respectively. The plurality of second cyclones 142 is arranged in a spaced-apart relation in a circumferential direction to each other around the first cyclone body 123. Also, the second cyclones 142 are disposed around the outer circumferential surface of the first cyclone body 123 except a portion thereof in which the inflow pipe 129 is disposed.

Each of the plurality of second cyclones 142 includes a second cyclone chamber 148, a second cyclone body 146 to form the second cyclone chamber 148, a second air inflow part 147 and an outflow pipe 143.

Like the first cyclone body 123, the second cyclone body 146 has a convex cylinder shape. That is, the second cyclone body 146 is formed in a shape that two convex cylinder portions, the diameters of which are gradually increased from a top end and a bottom end thereof to the middle (a line O-O' of FIG. 2) thereof, respectively, are joined to be symmetrical to each other on the middle thereof. Here, the reason why joins the two convex cylinder portions at the middle of the second cyclone body 146 is to maximize a diameter of the second cyclone body 146 in the vicinity of an entrance of the outflow pipe 143 so as to counterbalance a flow of the air, which severely flows at the entrance of the outflow pipe 143 through which the air is discharged.

Figure 5A:
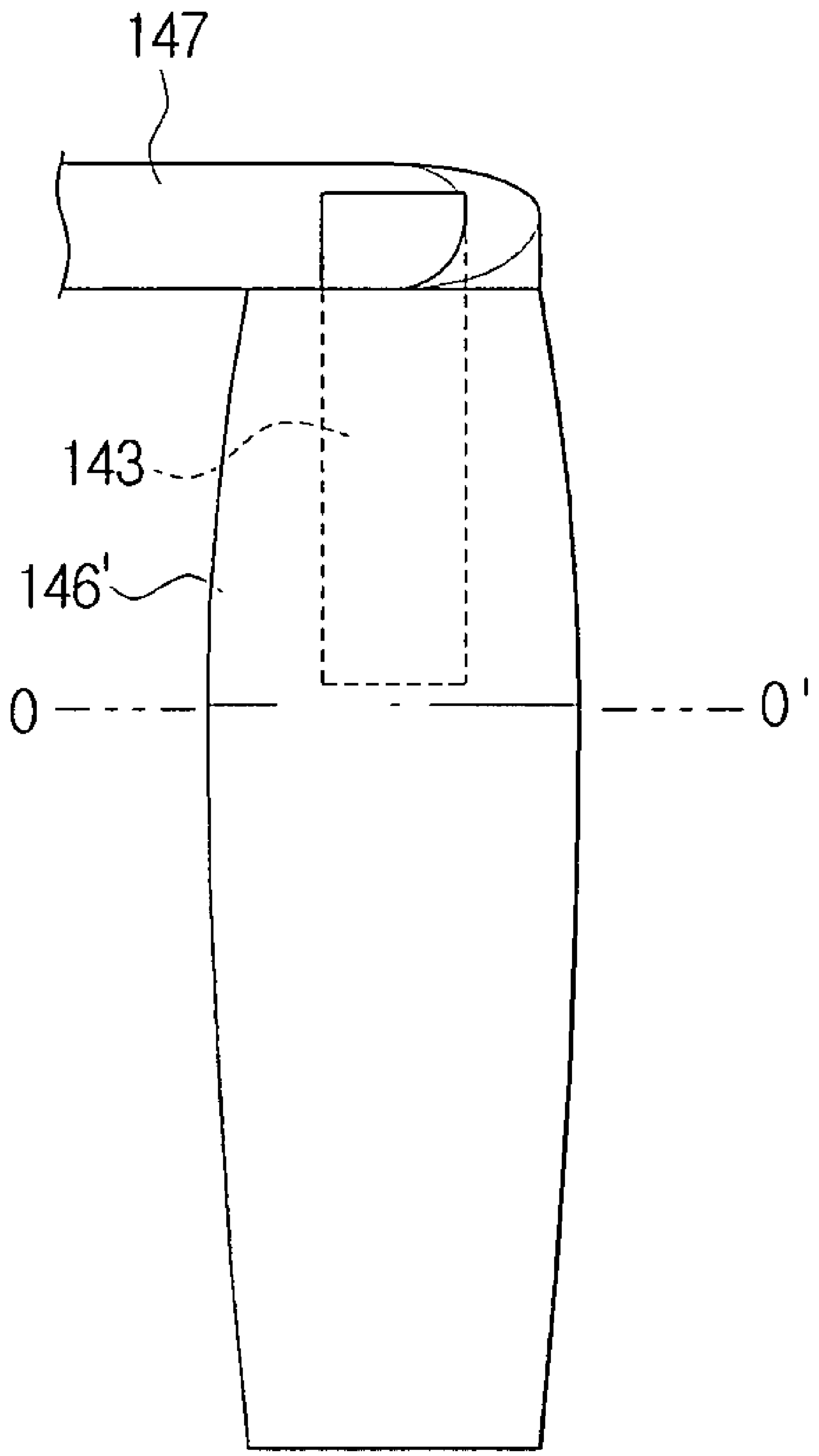
FIGS. 5A, 5B, 5C, 5D and 5E are cross-sectional views exemplifying modified examples of a second cyclone body of the multi cyclone dust-separating apparatus illustrated in FIG. 1.
Figure 5B:
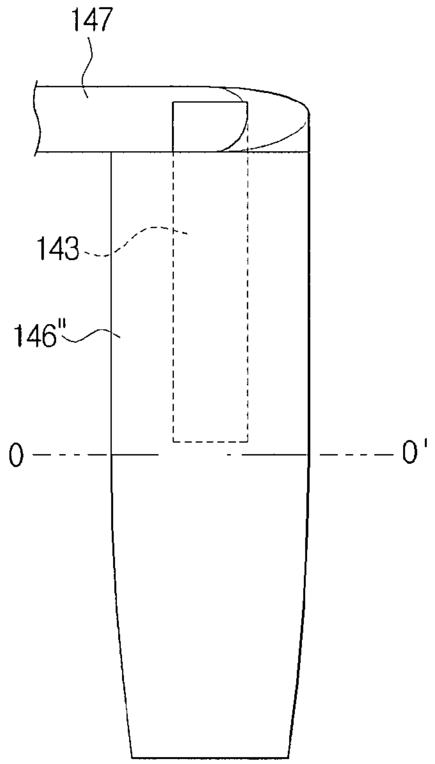
Figure 5C:
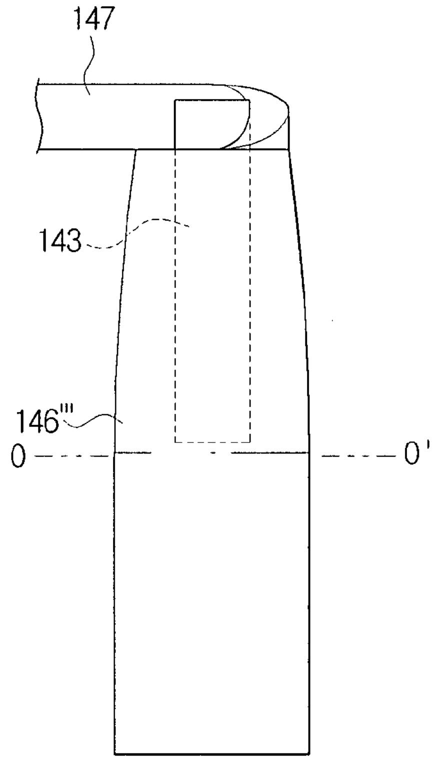
Figure 5D:
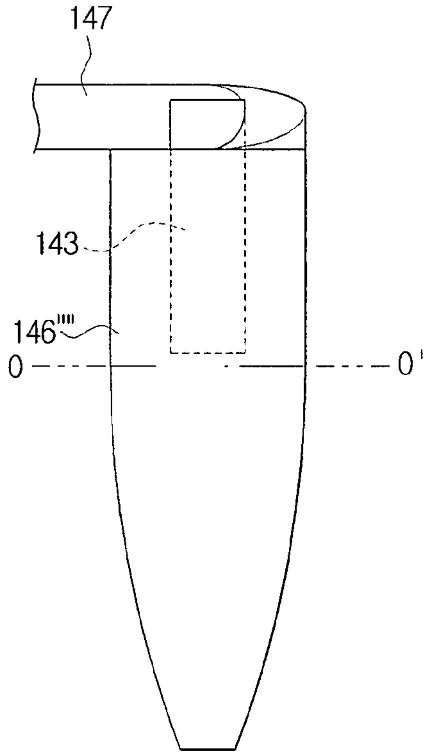
Figure 5E:
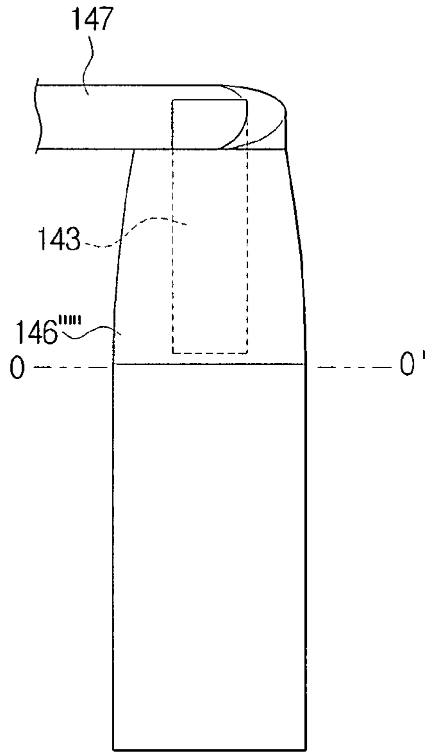

Alternatively, provided that the diameter of the second cyclone body 146 in the vicinity of the entrance of the outflow pipe 143 comes maximum, the second cyclone body 146 may be formed in a shape 146' that two convex cylinder portions having different lengths in a direction of longitudinal axis thereof are joined to each other along line 0-0' (see FIG. 5A), a shape 146" or 146''' that a linear cylinder portion, the diameter of which is uniform, and a convex cylinder portion, the diameter of which is gradually decreased or increased, having the same lengths in a direction of longitudinal axis thereof are joined to each other along line 0-0' (see FIGS. 5B and 5C), or a shape 146"" or 146'"" that a linear cylinder portion and a convex cylinder portion having different lengths in a direction of longitudinal axis thereof are joined to each other along line 0-0' (see FIGS. 5D and 5E). With this configuration of the second cyclone body 146, air flowing into the second cyclone chamber 148 through the second air inflow part 147 and moving in the second cyclone chamber 148 does not generate a sudden change in the flow in the vicinity of the entrance of the outflow pipe 143.

Each of the second cyclone bodies 146 at both the top end and the bottom end thereof is opened. The air laden with the dust or dirt is lowered while forming a whirling current in each of the second cyclone bodies 146, and thus minute dust or dirt included in the air is centrifugally separated from the air and discharged through the bottom end of each of the second cyclone bodies 146. The opened top end of each of the second cyclone bodies 146 is joined with a supporting body 138. The second air inflow parts 147 into which the air discharged from the first cyclone 120 flows and the outflow pipes 143 through which the air from which the dust or dirt is centrifugally separated and removed in the second cyclone chamber 148 are disposed to the supporting body 138 to communicate therewith.

Each of the second air inflow parts 147, which introduces the air discharged from the first air outlet 125 of the first cyclone 120 into the second cyclone chamber 148 of each of the second clones 142, extends in a radial direction from a center of the supporting body 138, and is connected to the corresponding second cyclone body 146 in a helical inlet shape through which the air gradually approaches in the form of a spiral toward the top end of the corresponding second cyclone body 146 from an upside of the top end of the second cyclone body 146 and then flows into the second cyclone body 146 while coming in contact with the top end and the inner circumferential surface of the second cyclone body 146. Alternatively, each of the second air inflow parts 147 can be formed in a tangential inlet shape, such as the inflow pipe 129 of the first cyclone 120 illustrated in FIG. 1, or an involute inlet shape, such as the inflow pipe 129" of the first cyclone 120 illustrated in FIG. 4B.

Accordingly, the air quickly raises toward the center of the supporting body 138 from the first cyclone 120 and moves in all directions along each of the second air inflow parts 147. Each of the second cyclone bodies 146 guides the air taken in through each of the second air inflow parts 147 to continuously maintain a whirling current in each of the second cyclone chambers 148. For this, an air guide member 157 in the form of a spiral is installed on an inner surface of each of the second cyclone bodies 146. Each of the outflow pipes 143, as an air discharging part, passes through the inside of the corresponding second cyclone body 146 and extends downward to or slightly above a portion of the second cyclone body 146 having a maximum diameter. Each of the outflow pipes 143 discharges purified air from which minute dust or dirt is centrifugally separated and removed, toward the cover member 149.

The cover member 149 is joined to the supporting member 138 to cover the supporting member 138. An air discharging pipe 145 is formed on an upper part of the cover member 149, so that it communicates with the outflow pipe 143 of each of the second cyclones 142. The air discharging pipe 145 guides the air discharged from each of the second cyclones 142 to discharge to the outside of the multi cyclone dust-separating apparatus 100.

The dust collecting unit 150 collects and stores the relatively large dust or dirt and the minute dust or dirt dust centrifugally separated from the air by the first and the second cyclones 120 and 142, respectively. The dust collecting unit 150 is configured, so that a top end thereof is opened and a bottom end thereof is blocked. To easily remove the collected and stored dust or dirt, the dust collecting unit 150 is detachably joined to the lower part of the cyclone unit 110. The dust collecting unit 150 is provided with a collecting bin body 151 to form an appearance thereof, a first dust collecting chamber 152 to collect the dust or dirt centrifugally separated from the air in the first cyclone 120, a second dust collecting chamber 153 to collect the dust or dirt centrifugally separated from the air in the second cyclones 142, and a partition 154 to divide the first and the second dust collecting chamber 152 and 153 from each other. A pillar 155 projects from a bottom of the collecting bin body 151. The pillar 155 prevents the dust or dirt collected in the first dust collecting chamber 152 from raising with the whirling current generated in the first dust collecting chamber 152. A separating member 156 extends between the pillar 155 and an inner wall of the collecting bin body 151, so that it prevents the dust or dirt collected and stored in the collecting bin body 151 from rotating or moving.

Figure 6:
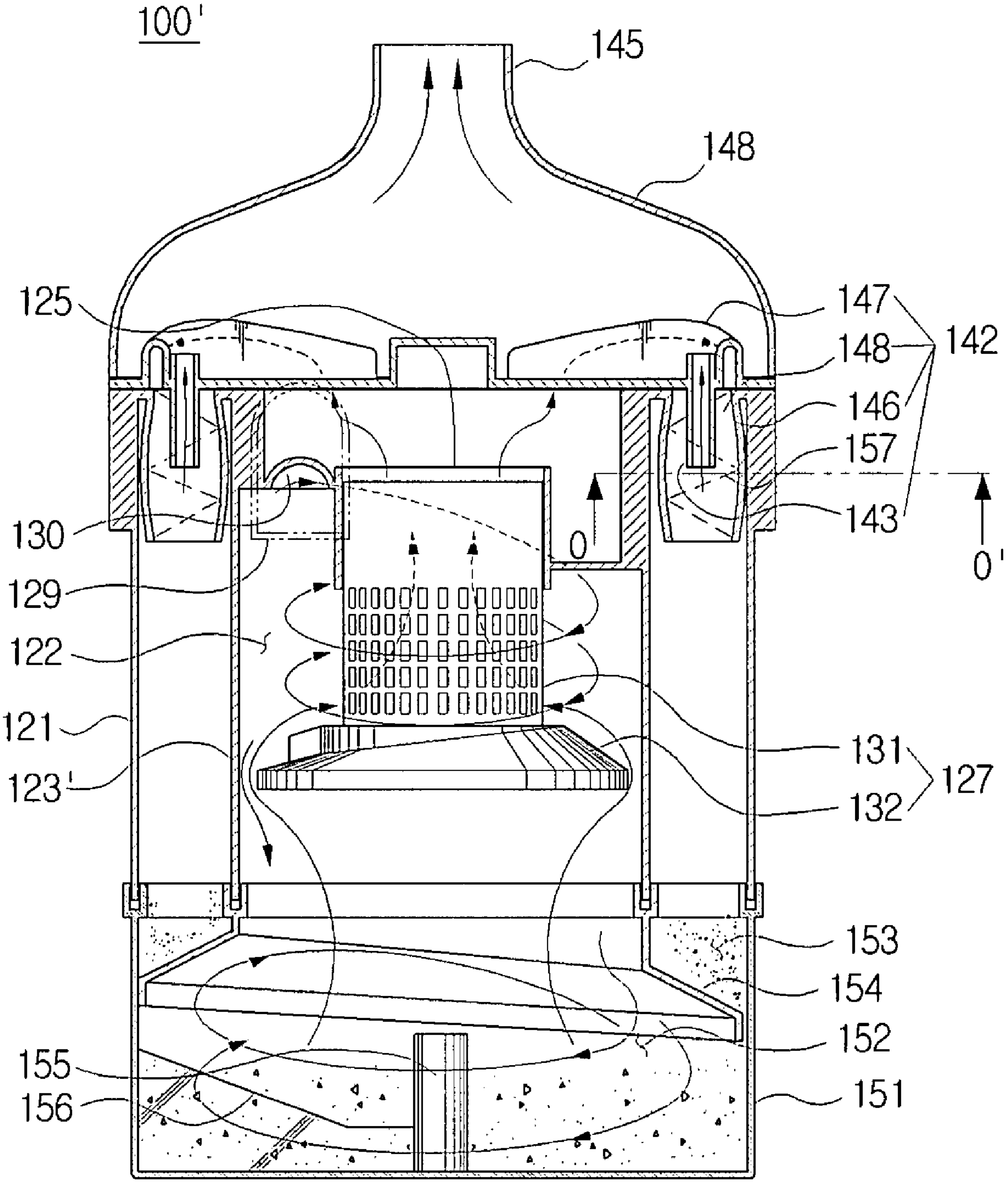
FIG. 6 is a cross-sectional view exemplifying a modified example of the multi cyclone dust-separating apparatus illustrated in FIG. 1.

Although in the multi cyclone dust-separating apparatus 100 according to the first exemplary embodiment of the present disclosure as described above, both the first and the second cyclone bodies 123 and 146 are illustrated and explained as formed in the convex cylinder shape, the present disclosure is not limited thereto. For instance, as illustrated in FIG. 6, a multi cyclone dust-separating apparatus 100' can be configured, so that a first cyclone body 123' is formed in a linear cylinder shape or a shape having a truncated cone portion at a lower part thereof as in conventional one and only second cyclone bodies 146 are formed in a convex cylinder shape.

As described above, the multi cyclone dust-separating apparatus 100 or 100' according to the first exemplary embodiment of the present disclosure is configured, so that the first and/or the second cyclone bodies 123 or 123' and 146 are formed in the convex cylinder shape. Accordingly, a flowing speed of the air discharged through the first air outlet 125 and the outflow pipes 143 is decreased, and thus an operating noise and a pressure loss of the vacuum cleaner are reduced. Such a decrease in the pressure loss reduces an output of a suction motor (not illustrated) of the vacuum cleaner, which is required to obtain the same dust-separating efficiency, thereby allowing the vacuum cleaner to use less power.

Hereinafter, an operation of the multi cyclone dust-separating apparatus 100 according to the first exemplary embodiment of the present disclosure as described above will now be explained in detail with reference to FIGS. 1 and 2.

Air laden with dust or dirt flows into the first cyclone chamber 122 through the first air inlet 124 via the inflow pipe 129. The air is lowered while forming a whirling current. Relatively large dust or dirt included in the air is centrifugally separated from the air and falls down, so that it is collected and stored in the first dust collecting chamber 152 of the dust collecting unit 150. And, the dust-removed air raises and passes through the grill member 137, and comes out of the first air outlet 125. Here, dust or dirt larger than the minute through-holes of the grill member 127 does not flow through the grill member 127, but is filtered by the grill member 127. The air rising through the first air outlet 125 is dispersed while dashing against the supporting body 138, and proceeds into each of the second cyclone bodies 146 through the air inflow part 147 of each of the second cyclones 142. The air flowing into each of the second cyclone bodies 146 is induced to a whirling current by the outflow pipe 143 in each of the second cyclones 142, so that minute dust or dirt is secondly separated from the air. That is, the air is lowered while forming the whirling current, and thus the minute dust or dirt, which has not removed from the air in the first cyclone 120, is centrifugally separated from the air and falls down, so that it is collected into and stored in the second dust colleting chamber 153 of the dust collecting unit 150.

The dust-removed air is discharged through the respective outflow pipes 143 of the second cyclones 142, and the air discharged from the respective outflow pipes 143 is mixed and discharged to the outside of the multi cyclone dust-separating apparatus 100 through the cover member 149 and the air discharging pipe 145. Here, the suction motor of the vacuum cleaner, which provides a suction force, can be directly or indirectly connected to the air discharging pipe 145.

Figure 7:
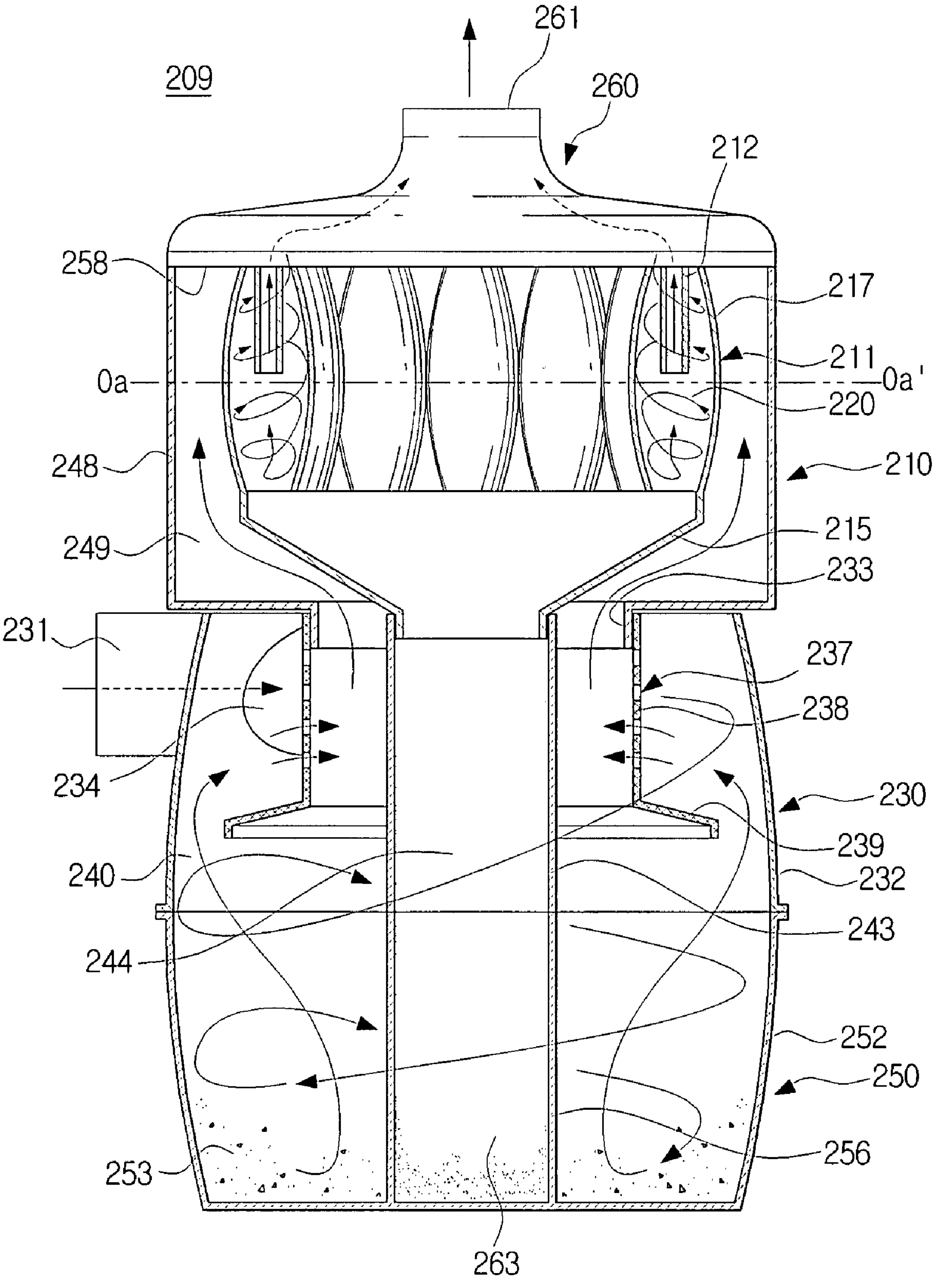
FIG. 7 is a cross-sectional view exemplifying a multi cyclone dust-separating apparatus of a vacuum cleaner according to a second exemplary embodiment of the present disclosure.

FIG. 7 exemplifies a multi cyclone dust-separating apparatus 209 of a vacuum cleaner according to a second exemplary embodiment of the present disclosure.

As illustrated in FIG. 7, the multi cyclone dust-separating apparatus 209 according to the second exemplary embodiment of the present disclosure includes a first cyclone 230, a second cyclone unit 210 joined to the first cyclone 230 above the first cyclone 230, a dust collecting unit 250 joined to the first cyclone 230 below the first cyclone 230, and a cover member 260.

The first cyclone 230 is provided with a first cyclone body 232, an inflow pipe 231 to draw in air into the first cyclone body 232, and a grill member 237 to filter dust or dirt from the air.

The first cyclone body 232 at a bottom part hereof is opened, and has the inside divided into a first chamber 240 and a second chamber 244 by a partition 243. The partition 243 is joined with a dust discharging guide 215 of the second cyclone unit 210 to be described later. The first chamber 240 acts to whirl the drawn-in air, and the second chamber 244 acts to guide dust or dirt discharged through dust discharging guide 215 to a second dust collecting chamber 263 of the dust collecting unit 250, which will be described below.

In addition, the first cyclone body 232 is formed in a convex cylinder shape, the diameter of which is gradually increased toward a lower part thereof. In this manner, the first cyclone body 232 in the convex cylinder shape whirls the air in the first chamber 240 and discharges the air therefrom, without subjecting the air to resistance.

The inflow pipe 231, as a first air inflow part to draw in the air laden with the dust or dirt into the first chamber 240 of the first cyclone body 232, is formed, so that it is connected to the first cyclone body 232 in a tangential inlet shape through which the air laden with the dust or dirt flows into the first cyclone body 232 while coming in contact directly with an inner circumferential surface of the first cyclone body 232 through an inlet 234 of the first cyclone body 232. Alternatively, the inflow pipe 231 can be formed in a helical inlet shape or an involute inlet shape, like the inflow piped 129' and 129" of the first exemplary embodiment illustrated in FIGS. 4A and 4B.

The grill member 237 is provided with a grill body 238 having a plurality of minute through-holes formed therein, and a skirt 239 joined to a lower end of the grill body 238 around the partition 243. A top end of the grill body 238 is joined to an air inlet 233 of a housing 248 of the second cyclone unit 210 to be described later. A bottom of the body 238 is blocked, and the skirt 239 is extended around an outer circumferential surface of the lower end of the body 238. The skirt 239 acts to block the dust or dirt centrifugally separated from the air in the first chamber 240 of the first cyclone body 232 from flowing backward.

The second cyclone unit 210 separates dust or dirt, which has not separated from the air in the first cyclone 230, and includes a housing 248, a plurality of second cyclones 211 joined to a supporting body 258 in the housing 248, and a dust discharging guide 215 joined with the partition 243 of the first cyclone body 232 below the plurality of second cyclones 211.

The housing 248 at an upper part thereof is blocked by the supporting body 258, and at a lower part thereof, has the air inlet 233 joined with the top end of the grill body 238 of the grill member 237 to communicate with the grill member 237.

Figure 8:
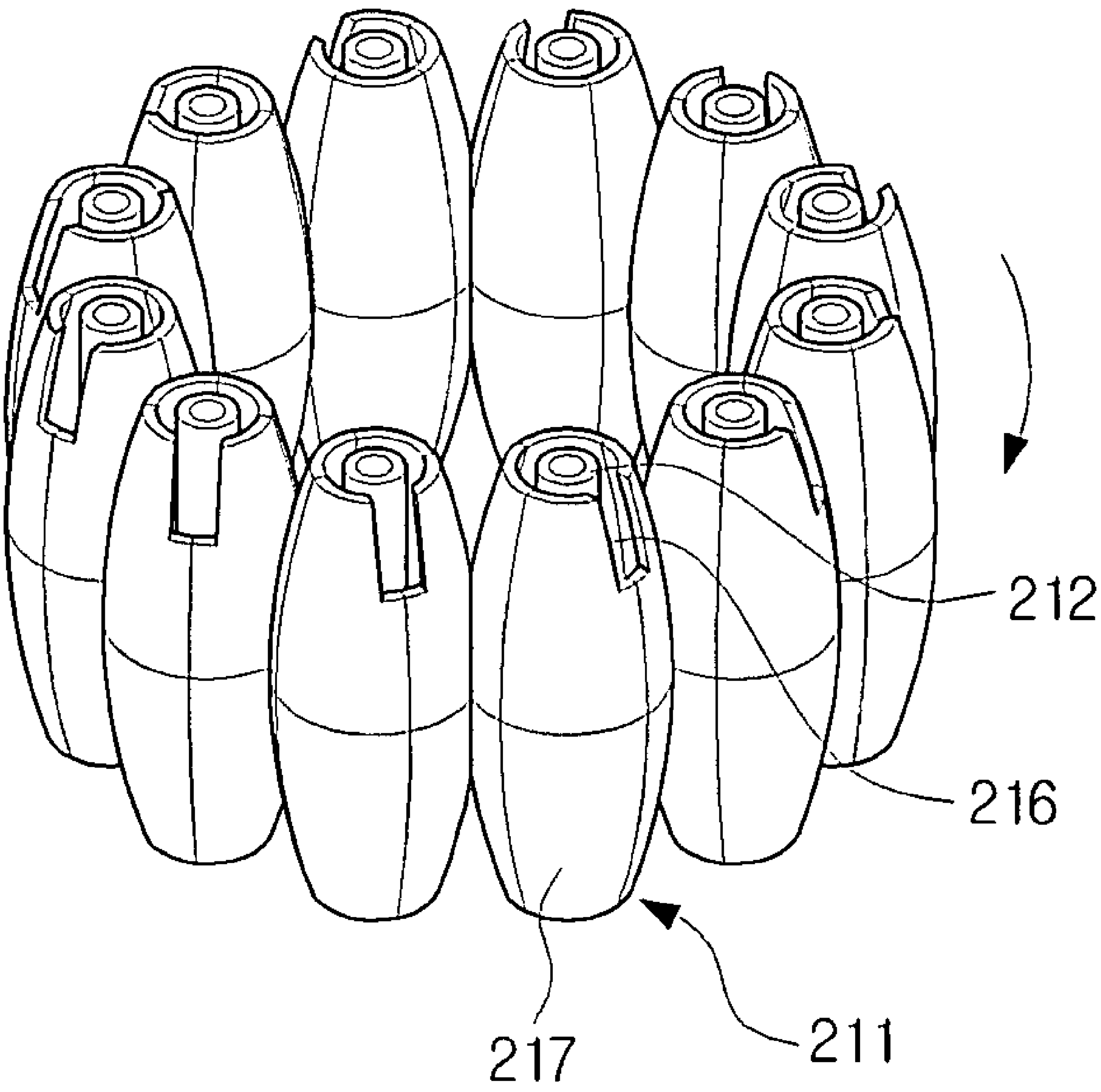
FIG. 8 is a partial perspective view exemplifying second cyclones of the multi cyclone dust-separating apparatus illustrated in FIG. 7.

As illustrated in FIG. 8, a plurality of, for example, twelve second cyclones 211 are disposed in a circular shape under the supporting body 258. To move and discharge the air flowing from the first cyclone 230 in a vertical direction with a whirling movement, each of the second cyclones 211 is disposed, so that a center axis line thereof is substantially parallel to a center axis line for whirling movement of the first cyclone 230. Each of the second cyclones 211 includes a second cyclone body 217, an air inflow part 216 to draw in the air into the second cyclone body 217, an outflow pipe 212 formed in the second cyclone body 217, and a dust discharging guide 215. Since the second cyclones 211 have the same construction and the same function, only one second cyclone will be described in detail.

The second cyclone body 217 has a second cyclone chamber 220 therein to whirl the air flowing in from the first cyclone 230. In the second cyclone body 217 is installed an outflow pipe 212, which assists the air to smoothly form a whirling current and discharges the air.

The second cyclone body 217 is formed in a convex cylinder shape, an upper part of which is joined with and blocked by the supporting body 258 and a lower part of which is opened. That is, the second cyclone body 217 is formed in a shape that two convex cylinder portions, the diameters of which are gradually increased from a top end and a bottom end thereof to the middle (a line Oa-Oa' of FIG. 7) thereof, respectively, are joined to be symmetrical to each other on the middle thereof. Alternatively, like the cyclone bodies 146', 146'', 146''', 146'''' and 146''''' of the first embodiment, provided that the diameter of the second cyclone body 217 in the vicinity of an entrance of the outflow pipe 212 comes maximum, the second cyclone body 217 may be formed in a shape that two convex cylinder portions having different lengths in a direction of longitudinal axis thereof are joined to each other, or a shape that a linear cylinder portion and a convex cylinder portion having the same lengths or different lengths in a direction of longitudinal axis thereof are joined to each other.

With this configuration, the air flowing into the second cyclone chamber 220 of the second cyclone body 217 and moved in the second cyclone chamber 220 does not generate a sudden change in the flow in the vicinity of the entrance of the outflow pipe 212 when it is discharged through the outflow pipe 212. As a result, a flowing speed of the air, which is discharged through the cover member 260 and an air discharging pipe 261 to be described later, is decreased, and thus a pressure loss of the vacuum cleaner are reduced.

The air inflow part 216, as a second air inflow part to draw in the air of the housing 248 into the cyclone chamber 220 of the second cyclone body 217, is disposed in an outside of the upper part of the second cyclone body 217 to communicated with an air chamber 249 of the housing 248. As illustrated in FIG. 8, the air inflow part 216 is formed in a shape that an outside portion of the upper part of the second cyclone body 217 is cut away in a rectangular shape, thereby allowing the air whirling in the air chamber 249 to flow into the second cyclone body 217 along an inner circumferential surface of the second cyclone body 217 in a tangential direction thereof. At this time, preferably, but not necessarily, the air inflow parts 216 of the second cyclones 211 are disposed in intervals of 30 degrees. Alternatively, there is not illustrated in the drawings, the air inflow parts 216 can be formed in a helical inlet shape or an involute inlet shape from which a projected portion of the inflow pipe 129' or 129'' of the first embodiment illustrated in FIGS. 4A and 4B is cut away.

The dust discharging guide 215 is funnel-shaped, and installed below the second cyclone bodies 117 to guide minute dust or dirt centrifugally separated from the air in the second cyclone chambers 220 of the second cyclone bodies 217, into the second dust collecting chamber 263 of the dust collecting unit 250 via the second chamber 244 of the first cyclone 230.

The dust collecting unit 250 is detachably joined to the lower part of the first cyclone body 232. The dust collecting unit 250, which separately collects and stores relatively large dust or dirt and minute dust or dirt centrifugally separated in the first and the second cyclones 230 and 211, respectively, is configured, so that it is divided into a first dust collecting chamber 253 and a second dust collecting chamber 263 by a partition 256 provided in the a collecting bin body 252.

The collecting bin body 252 is formed in a convex cylinder shape, the diameter of which is gradually decreased toward a lower part thereof and which is symmetrical to the first cyclone body 232. That is, the collecting bin body 252 and the first cyclone body 232 forms a single convex cylinder, which two convex cylinder portions are symmetrically joined.

Alternatively, like the first cyclone bodies 123', 123'', 123''', 123'''' and 123''''' of the first embodiment illustrated FIGS. 3A through 3E, the collecting bin body 252 and the first cyclone body 232 can form a shape that two convex cylinder portions having different lengths in a direction of longitudinal axis thereof are joined to each other, or a shape that a linear cylinder portion and a convex cylinder portion having the same lengths or different lengths in a direction of longitudinal axis thereof are joined to each other. Accordingly, the air flowing into the first chamber 240 and the first dust collecting chamber 253 can whirl in the first chamber 240 and the first dust collecting chamber 253 and then move to the second cyclone unit 210 through the grill member 237, without being subject to resistance.

The cover member 260 is joined to the supporting member 288 to cover the supporting member 258. An air discharging pipe 261 is formed on an upper part of the cover member 260, so that it is communicated with the outflow pipe 212 of each of the second cyclones 211. Each of the air discharging pipes 261 guides the air discharged through each of the outflow pipes 212 from each of the second cyclones 211 to discharge to the outside of the multi cyclone dust-separating apparatus 209.

Figure 9:
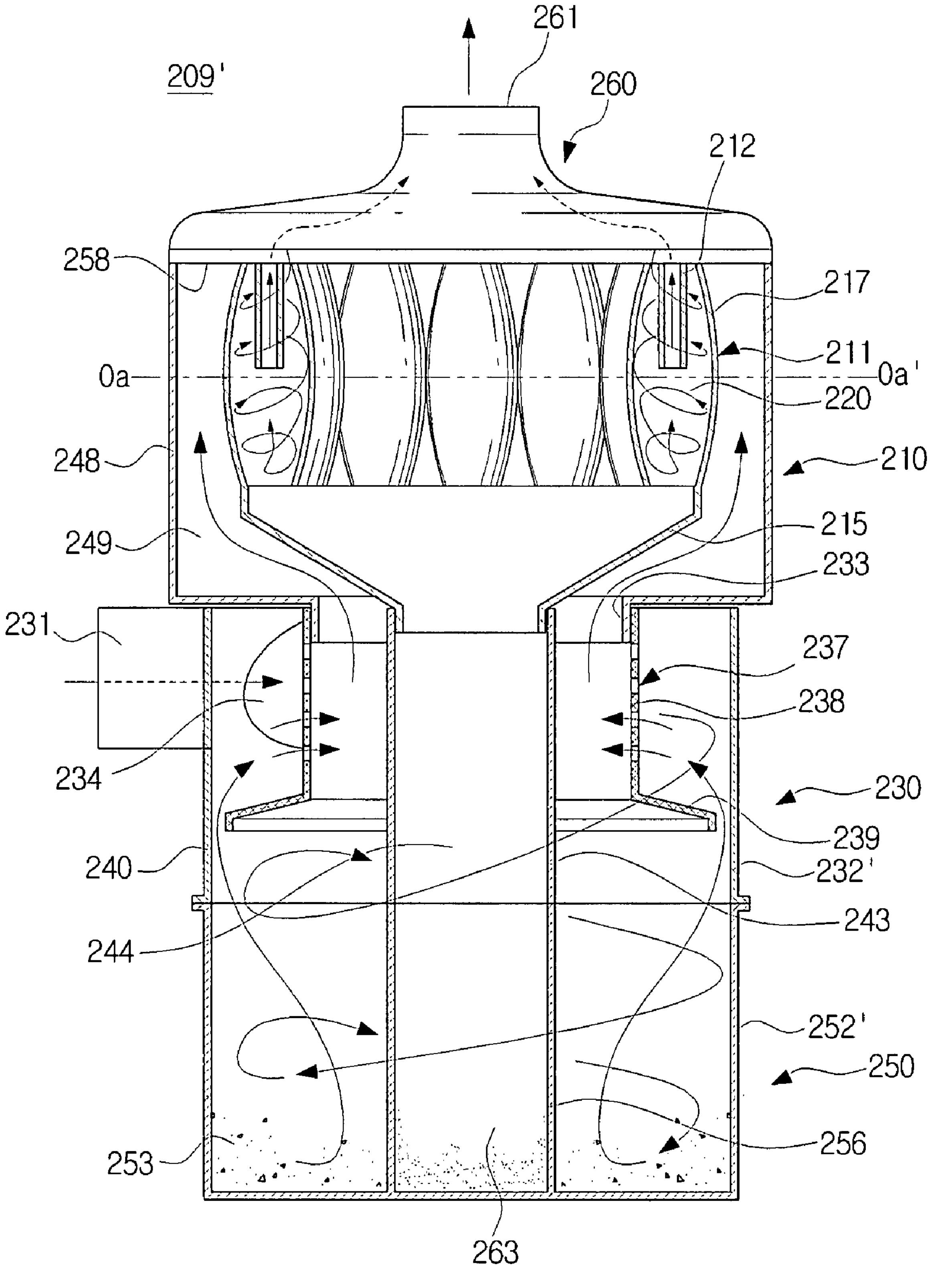
FIG. 9 is a cross-sectional view exemplifying a modified example of the multi cyclone dust-separating apparatus illustrated in FIG. 7.

Although in the multi cyclone dust-separating apparatus 209 according to the second exemplary embodiment of the present disclosure as described above, both the second cyclone bodies 217 and the first cyclone body 232 and the collecting bin body 252 are illustrated and explained as formed in the convex cylinder shape, the present disclosure is not limited thereto. For instance, as illustrated in FIG. 9, a multi cyclone dust-separating apparatus 209' can be configured, so that a collecting bin body 252' and a first cyclone body 232' are formed to have a linear cylinder shape as in conventional one and only second cyclone bodies 217 are formed in a convex cylinder shape.

As described above, the multi cyclone dust-separating apparatus 209 or 209' according to the second exemplary embodiment of the present disclosure is configured, so that the second cyclone bodies 217 and/or the first cyclone body 232 and the collecting bin body 252 are formed in the convex cylinder shape. Accordingly, a flowing speed of the air discharged through the top end of the grill member 237 and the outflow pipe 212 is decreased, and thus an operating noise and a pressure loss of the vacuum cleaner are reduced. Such a decrease in the pressure loss reduces an output of the suction motor of the vacuum cleaner, which is required to obtain the same dust-separating efficiency, thereby allowing the vacuum cleaner to use less power.

Now, an operation of the multi cyclone dust-separating apparatus 209 according to the second exemplary embodiment of the present disclosure as described above will be explained in detail with reference to FIGS. 7 and 8.

As illustrated in FIG. 7, air laden with dust or dirt flows into the first chamber 240 of the first cyclone body 232 through the inflow pipe 231. The air is guided by the inner circumferential surface of the first cyclone body 232 to change into a whirling current. Relatively large dust or dirt falls down due to a centrifugal action of the whirling current, and is collected and stored in the first dust collecting chamber 253 of the dust collecting unit 250. And, relatively clean air passes through the grill member 237, raises through the air inlet 233, and flows into the housing 248. The air flowing into the housing 248 proceeds into each of the second cyclone chambers 220 of the second cyclone bodies 217 through each of the air inflow parts 216 of the second cyclones 211. The proceeded-in air is induced to a whirling current by the outflow pipe 212 in each of the second cyclone chambers 220, so that dust or dirt is secondly separated therefrom. Accordingly, minute dust or dirt, which has not been separated from the air in the first cyclone 230, comes out of each of second cyclones 211 through the lower part of each of the second cyclone bodies 217 due to the centrifugal force, and is collected and stored in the second dust collecting chamber 263 of the dust collecting unit 250 through the dust discharging guide 215 and the second chamber 244 of the first cyclone 230. And, the whirling current goes out of each of the second cyclones 211 toward the cover member 260 through each of the outflow pipes 212 of the second cyclones 211 again. The air discharged to the cover member 260 is discharged to the outside through the air discharging pipe 262.

Figure 10:
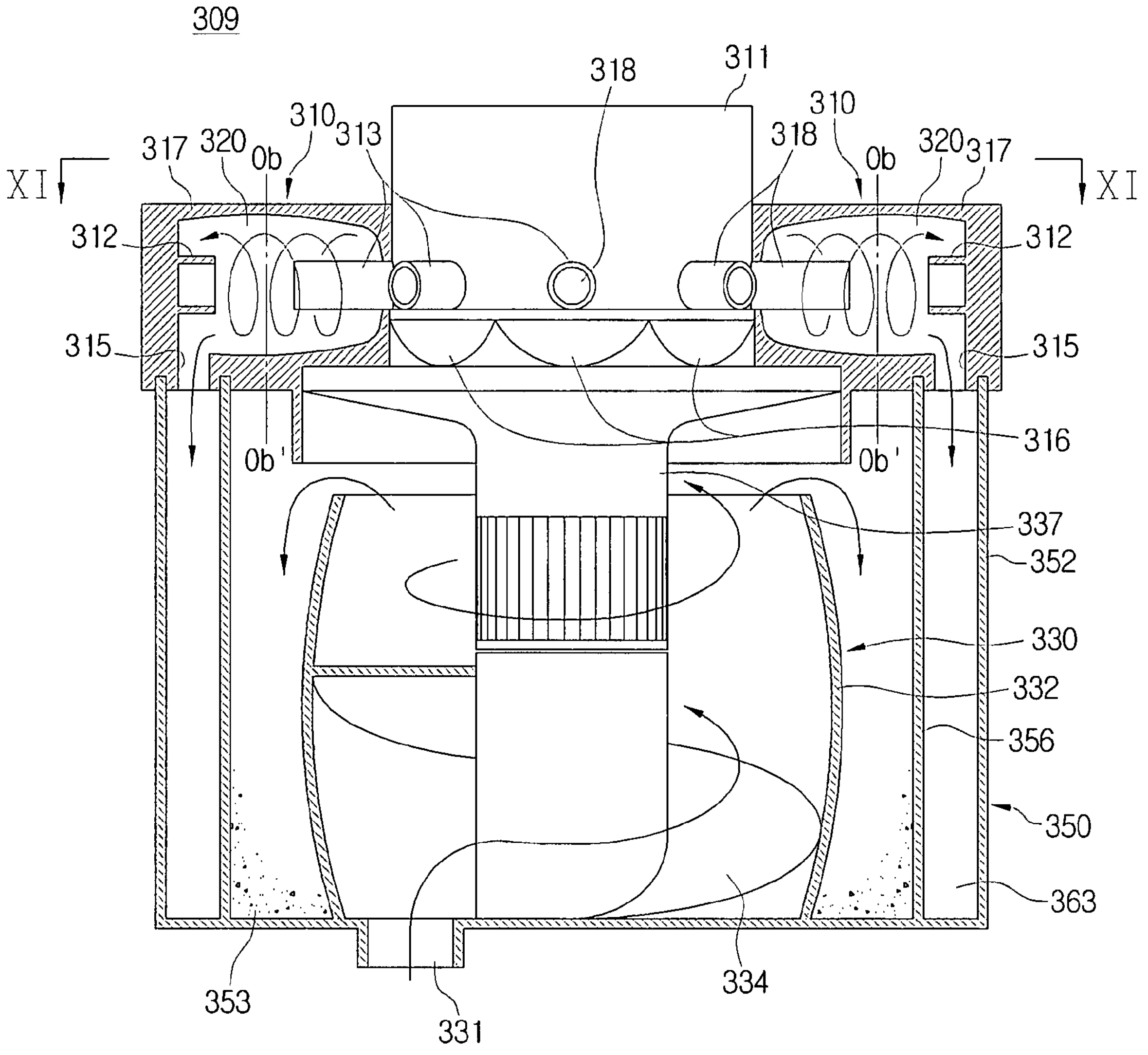
FIG. 10 is a cross-sectional view exemplifying a multi cyclone dust-separating apparatus of a vacuum cleaner according to a third exemplary embodiment of the present disclosure.
Figure 11:
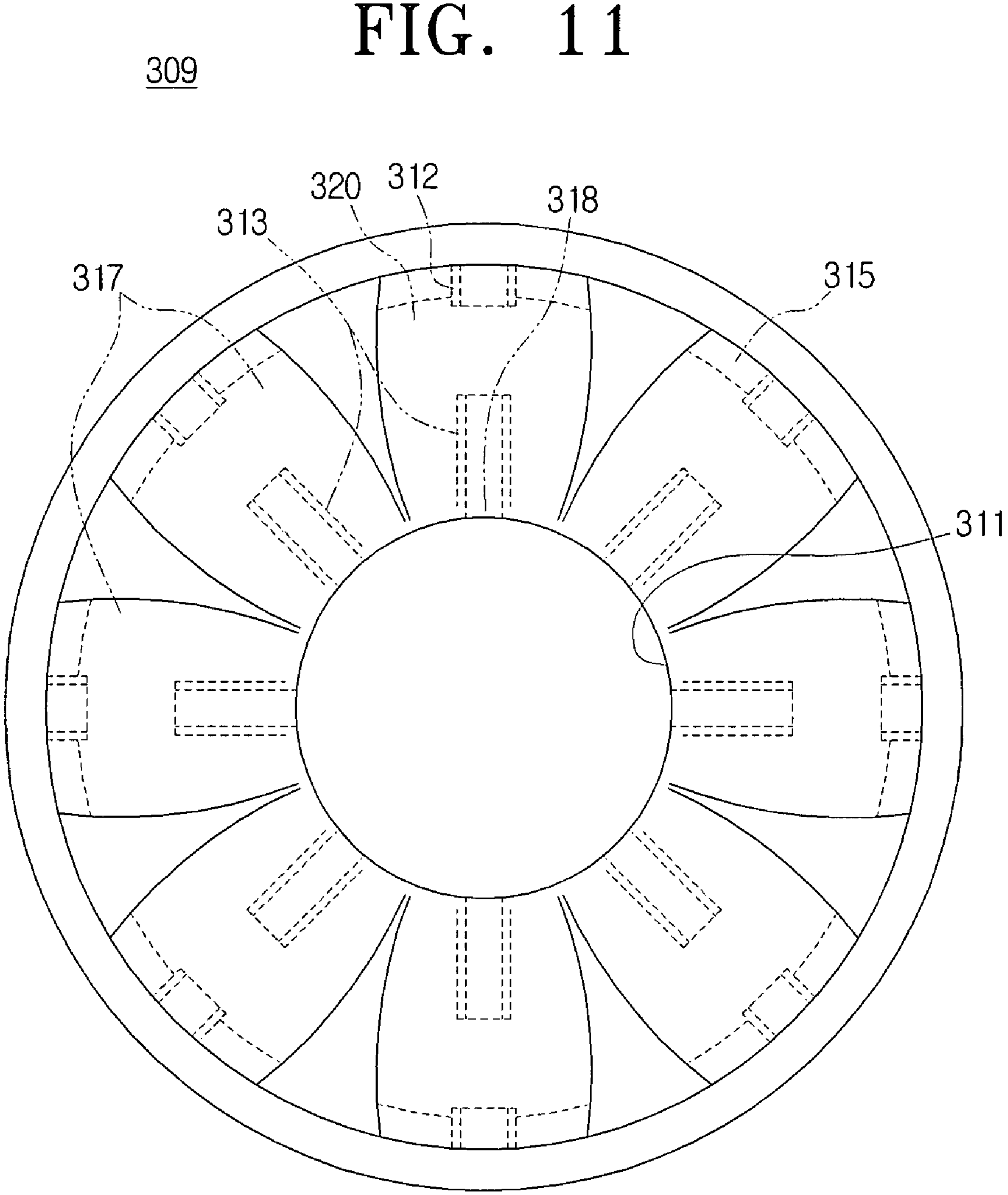
FIG. 11 is a top plan view taken along line XI-XI of FIG. 10.

FIGS. 10 and 11 exemplify a multi cyclone dust-separating apparatus 309 of a vacuum cleaner according to a third exemplary embodiment of the present disclosure.

As illustrated in FIG. 10, the multi cyclone dust-separating apparatus 309 according to the third exemplary embodiment of the present disclosure includes a first cyclone 330, a plurality of second cyclones 310 horizontally disposed above the first cyclone 330, and a dust collecting unit 350 disposed above and around the first cyclone 330.

The first cyclone 330 is configured to include a first cyclone body 332 disposed inside the dust collecting unit 350, a guide member 334 to guide air drawn in into the first cyclone body 332 to raise in the form of a spiral, and a grill member 337 joined to the guide member 334.

The first cyclone body 332 at an upper part hereof is opened. In the inside of the first cyclone body 332 are disposed the guide member 334 and the grill member 337.

The first cyclone body 332 is formed in a shape that two convex cylinder portions, the diameters of which are gradually increased from a top end and a bottom end thereof to the middle thereof, respectively, are joined to be symmetrical to each other. Alternatively, like the first cyclone bodies 123', 123'', 123''', 123'''' and 123''''' of the first embodiment illustrated in FIGS. 3A through 3E, the first cyclone body 332 may be formed in a shape that two convex cylinder portions having different lengths in a direction of longitudinal axis thereof are joined to each other, or a shape that a linear cylinder portion and a convex cylinder portion having the same lengths or different lengths in a direction of longitudinal axis thereof are joined to each other. Accordingly, the air flowing into the first cyclone body 332 can whirl along the guide member 334 and then move to the second cyclones 310, without being subject to large resistance. On a lower part of the first cyclone body 332 is formed an inflow pipe 331. The inflow pipe 331, which takes in the air into the first cyclone body 332, can be formed in a tangential inlet shape, a helical inlet shape, or an involute inlet shape, like the inflow pipe 129, 129' and 129'' of the first embodiment illustrated in FIGS. 1, 4A and 4B. The guide member 334 functions to raise the air flowing into the first cyclone body 332 while whirling in the spiral direction and thus to guide dust or dirt included in the air to a first dust collecting chamber 353 of the dust colleting unit 350 through the upper part of the first cyclone body 332 along an inner circumferential surface of the first cyclone body 332. The grill member 337 in which a plurality of minute through-holes is formed is disposed on an upper part of the guide member 334. The grill member 337 draws in air laden with minute dust or dirt, which is not separated from the air by the guide member 334, but remained in the air, and guides it to the plurality of second cyclones 310.

As illustrated in FIG. 11, a plurality of, for example, eight second cyclones 310 are radially disposed around an air discharging pipe 311, and connected with the air discharging pipe 311. Each of the second cyclones 310 include a second cyclone body 317, a first pipe 312 and a second pipe 313 formed in the second cyclone body 317, an air inflow part 316, a dust discharging tube 315, and an air discharging opening 318 to communicate with the air discharging pipe 311.

The eight second cyclones 310 are disposed in a radial direction to correspond to the eight air inflow parts 316. Since the eight second cyclones 310 have the same construction and the same function, only a second cyclone 310 will be described in detail.

The second cyclone body 317 has a cyclone chamber 320 therein to whirl the air flowing in from the first cyclone 330. To assist the air to smoothly form a whirling current, the second pipe 313 and the first pipe 312 are disposed opposite to each other on both ends of the second cyclone body 317, respectively, while having the same center axis. The air inflow part 316, which draws in the air into the cyclone chamber 320 of the second cyclone body 317, is communicated with an upper part of the grill member 337, and is radially disposed to correspond to the cyclone chamber 320. Although there is not illustrated, the air inflow part 316 can be formed, so that it is connected in a tangential inlet shape, a helical inlet shape or an involute inlet shape with the second cyclone body 317, like the second air inflow part 147 of the first embodiment.

The second cyclone body 317 is formed in a convex cylinder shape. That is, the second cyclone body 317 can be formed in a shape that two convex cylinder portions, the diameters of which are gradually increased from the both ends to the middle (a line Ob-Ob' of the drawing) of the second cyclone body 317, respectively, are joined to be symmetrical to each other on the middle of the second cyclone body 317. Here, the reason why joins the two convex cylinder portions at the middle (the line Ob-Ob' of the drawing) of the second cyclone body 317 is to maximize a diameter of the second cyclone body 317 in the vicinity of an entrance of the second pipe 313 so as to counterbalance a flow of the air, which severely flows at the entrance of the second pipe 313. Alternatively, provided that the diameter of the second cyclone body 317 in the vicinity of the entrance of the second pipe 313 comes maximum, the second cyclone body 317 may be formed in a shape that two convex cylinder portions having different lengths in a direction of longitudinal axis thereof are joined to each other, or a shape that a convex cylinder portion and a linear cylinder portion having the same lengths or different lengths in a direction of longitudinal axis thereof are joined to each other. With this configuration, the air flowing into and moved in the second cyclone body 317 does not generate a sudden change in the flow in the vicinity of the entrance of the second pipe 313. As a result, a flowing speed of the air, which is discharged through the air discharging pipe 311, is decreased, and thus a pressure loss of the vacuum cleaner are reduced.

The dust discharging tube 315 is vertically disposed on a side of each of the second cyclone bodies 317, so that it sends minute dust or dirt centrifugally separated from the air in the second cyclone body 317 to a second dust collecting chamber 363 of the dust collecting unit 350. Each of the air discharging openings 318 is formed at a lower part of the air discharging pipe 311 so as to communicate with each of the second pipes 313.

The dust collecting unit 350 is detachably joined to lower parts of the second cyclones 310. The dust collecting unit 350, which separately collects and stores relatively large dust or dirt and minute dust or dirt centrifugally separated in the first and the second cyclones 330 and 310, respectively, is configured, so that it is divided into a first dust collecting chamber 353 and a second dust collecting chamber 363 by a partition 356 provided in the a collecting bin body 352.

An operation of the multi cyclone dust-separating apparatus 309 according to the third exemplary embodiment constructed as described above is almost similar to that of the multi cyclone dust-separating apparatus 209 explained with reference to FIGS. 7 and 8. Accordingly, a detailed description on the operation of the multi cyclone dust-separating apparatus 309 will be omitted.

As apparent from the foregoing description, according to the exemplary embodiments of the present disclosure, the multi cyclone dust-separating apparatus is configured, so that the second cyclone bodies and/or the first cyclone body and the collecting bin body are formed in the convex cylinder shape. Accordingly, the flowing speed of the air discharged from the first cyclone and/or the second cyclones is decreased, and thus then operating noise and the pressure loss of the vacuum cleaner are reduced. Such a decrease in the pressure loss reduces the output of the suction motor of the vacuum cleaner, which is required to obtain the same dust-separating efficiency, thereby allowing the vacuum cleaner to use less power.

Although representative embodiments of the present disclosure have been shown and described in order to exemplify the principle of the present disclosure, the present disclosure is not limited to the specific embodiments. It will be understood that various modifications and changes can be made by one skilled in the art without departing from the spirit and scope of the disclosure as defined by the appended claims. Therefore, it shall be considered that such modifications, changes and equivalents thereof are all included within the scope of the present disclosure.

What is claimed is:

1. A multi cyclone dust-separating apparatus comprising:

a cyclone unit having a first cyclone, which is disposed in such a manner that a longitudinal axis thereof is substantially vertically arranged and which separates relatively large dust or dirt from air drawn in through a first air inflow part, and a plurality of second cyclones, each of which is disposed in such a manner that longitudinal axes thereof are substantially vertically arranged, each of which has a second air inflow part to communicate with the first cyclone and an air discharging part to discharge the air, and each of which separates relatively minute dust or dirt from the air drawn in through the second air inflow part; and a dust collecting unit disposed below the cyclone unit to collect and store the dust or dirt separated from the air by the cyclone unit, wherein each of cyclone bodies of the plurality of second cyclones is formed in a convex cylinder shape so that a diameter thereof in the vicinity of an entrance of the air discharging part is a maximum diameter.

2. The apparatus as claimed in claim 1, wherein each of the cyclone bodies of the plurality of second cyclones is formed, so that at least two convex cylinder portions, the diameters of which are gradually increased, are joined with each other.

3. The apparatus as claimed in claim 2, wherein the two convex cylinder portions are formed to have the same lengths in a direction of longitudinal axis thereof.

4. The apparatus as claimed in claim 2, wherein the two convex cylinder portions are formed to have different lengths in a direction of longitudinal axis thereof.

5. The apparatus as claimed in claim 1, wherein each of the cyclone bodies of the plurality of second cyclones is formed, so that at least one linear cylinder portion, the diameter of which is uniform, and at least one convex cylinder portion, the diameter of which are gradually varied, are joined with each other.

6. The apparatus as claimed in claim 5, wherein the two cylinder portions are formed to have the same lengths in a direction of longitudinal axis thereof.

7. The apparatus as claimed in claim 5, wherein the two cylinder portions are formed to have different lengths in a direction of longitudinal axis thereof.

8. The apparatus as claimed in claim 1, wherein each of the first and the second air inflow part is formed in one of a tangential inlet shape through which the air are flowed into the cyclone body of the first cyclone or each of the second cyclones while coming in contact directly with an inner circumferential surface of the cyclone body, a helical inlet shape through which the air is gradually approached in the form of a spiral toward one end surface of the cyclone body of the first cyclone or each of the second cyclones from an outside of the one end surface of the cyclone body and then flowed into the cyclone body while coming in contact with the inner circumferential surface of the cyclone body, and an involute inlet shape through which the air is gradually approached in the form of a volute toward an outer circumferential surface and the inner circumferential surface of the cyclone body of the first cyclone or each of the second cyclones from an outside of the outer circumferential surface of the cyclone body and then flowed into the cyclone body while coming in contact with the inner circumferential surface of the cyclone body.

9. The apparatus as claimed in claim 1, wherein a cyclone body of the first cyclone is formed in one of a shape having a truncated cone portion at a lower part thereof and a linear cylinder shape having a uniform diameter.

10. The apparatus as claimed in claim 1, wherein the plurality of second cyclones is disposed around the first cyclone.

11. The apparatus as claimed in claim 1, wherein the plurality of second cyclones is disposed above the first cyclone.

12. A multi cyclone dust-separating apparatus comprising:

a cyclone unit having a first cyclone, which is disposed in such a manner that a longitudinal axis thereof is substantially vertically arranged and which separates relatively large dust or dirt from air drawn in through a first air inflow part, and a plurality of second cyclones, each of which is disposed in such a manner that longitudinal axes thereof are substantially vertically arranged, each of which has a second air inflow part to communicate with the first cyclone and an air discharging part to discharge the air, and each of which separates relatively minute dust or dirt from the air drawn in through the second air inflow part; and a dust collecting unit disposed below the cyclone unit to collect and store the dust or dirt separated from the air by the cyclone unit, wherein each of cyclone bodies of the plurality of second cyclones is formed in a convex cylinder shape so that a diameter thereof in the vicinity of an entrance of the air discharging part is a maximum diameter, and wherein the dust collecting unit comprises a dust collecting bin body in the form of a convex cylinder to collect and store the dust or dirt.

13. The apparatus as claimed in claim 12, wherein the dust collecting bin body forms a single convex cylinder along with a cyclone body of the first cyclone.

14. A multi cyclone dust-separating apparatus comprising:

a first air inflow part for drawing in air;

a first cyclone having a first longitudinal axis, the first cyclone being configured so that the first longitudinal axis is substantially vertically arranged, the first cyclone being in fluid communication with the first air inflow part;

a second air inflow part in fluid communication with the first cyclone;

a plurality of second cyclones each having a cyclone body with a second longitudinal axis, the plurality of second cyclones being configured so that the second longitudinal axes are substantially vertically arranged, the plurality of second cyclones being in fluid communication with the second air inflow part; and an air discharging part in fluid communication with the plurality of second cyclones, each of cyclone body of the plurality of second cyclones being formed in a convex cylinder shape so that a diameter thereof in the vicinity of an entrance of the air discharging part is a maximum diameter.

* * * * *